United States Patent [19]

McGregor

[11] 3,876,624

[45] Apr. 8, 1975

[54] p-Glu-His-N(Me)-Ala-NH$_2$ AND INTERMEDIATES

[75] Inventor: William H. McGregor, Malvern, Pa.

[73] Assignee: American Home Products Corporation, New York, N.Y.

[22] Filed: Oct. 29, 1973

[21] Appl. No.: 410,585

[52] U.S. Cl.............................. 260/112.5; 424/177
[51] Int. Cl. .................... C07c 103/52; A61k 27/00
[58] Field of Search................................ 260/112.5

[56] References Cited
OTHER PUBLICATIONS

Bowers et al.: Biochem. Biophys. Res. Comm., 40, 683–691 (1970).

*Primary Examiner*—Lewis Gotts
*Assistant Examiner*—Reginald J. Suyat

[57] ABSTRACT

A novel tripeptide of the formula p—Glu—His—N(CH$_3$)Ala—NH$_2$ and intermediates are described. The tripeptide is active in releasing thyrotropin.

1 Claim, No Drawings

P-GLU—HIS—N(Me)—ALA—NH₂ AND INTERMEDIATES

The thyrotropin releasing hormone (TRH) is one of the neurohormones of the hypothalamus gland of mammalian species. Within the five years the structure of TRH has been reported in the literature as the tripeptide L—p—Glu—L—His—L—Pro—NH₂ [See Burgus et al., Ann. Rev. Biochem, 39, pp 504-511 (1970), U.S. Pat. No. 3,753,969, Guillemin et al., Vits. and Hormones, 29, pp 1–39 (Academic Press 1971)]. TRH has utility in the diagnostic evaluation of the functioning of the anterior pituitary gland as discussed in column 2, lines 1–12 of U.S. Pat. No. 3,753,969 and is in clinical use as described by Guillemin et al., supra, at pages 34–35.

The present invention relates to a structural modification of TRH by replacing proline with N-methyl alanine.

The novel tripeptides of the present invention are represented by the formula

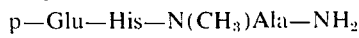

I and non-toxic acid addition salts thereof.

The present invention also includes within its scope tripeptides of the formula

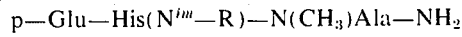

II and non-toxic acid addition salts thereof. In formula II, N$^{im}$ means the nitrogen atoms of the imidazole ring of histidine and R is a protecting group for the imidazole nitrogens. The selection of such protecting group is not critical except such group should fulfill the following requirements (a) be one that is easily cleaved without alteration or destruction of the tripeptide chain, and (b) not interfere with or otherwise give rise to side reactions during the synthesis of the tripeptide. Illustrative of such protecting groups are tosyl, benzyl, trityl, 2,2,2-trifluoro-1-benzyloxycarbonylaminoethyl and 2,-2,2-trifluoro-1-tert-butyloxycarbonylaminoethyl.

All chiral amino acid residues identified in formulas I and II supra, are of the natural or L-configuration unless specified otherwise.

Illustrative of non-toxic, pharmaceutically aceptable, acid addition salts, contemplated by formulas I and II, are hydrochloride, hydrobromide, sulfate, phosphate, maleate, acetate, citrate, benzoate, succinate, malate, ascorbate and the like.

The tripeptide of the present invention may be synthesized by either the classical route or solid phase method, preferably the classical method is used. The classical method involves converting N-methyl alanine (available from Bachem Inc., Marino, Del. Rey, Calif.) to the corresponding amide via the ammonolysis route in methanol to obtain N(CH₃)Ala—NH₂. This compound is then reacted with an azide of the formula p—Glu—His—N₃ or p—Glu—His(N$^{im}$—R)—N₃ at a temperature between −40°C and about +50°C in an aqueous or nonaqueous solvent (e.g. dimethylformamide, tetrahydrofuran, dioxane, chloroform, methylene chloride, toluene, etc.). The azide may be formed in situ without isolation from the reaction medium by reacting a hydrazide of the formula p—Glu—His—NH₂ or p—Glu—His(N$^{im}$—R)— NH₂ with a reagent which yields nitrous acid in situ at a temperature between about −40°C and +20°C to form the corresponding azide and thereafter adding N(CH₃)Ala—NH₂ to the reaction medium to form the tripeptide p—Glu—His—N(CH₃)Ala—NH₂ or p—Glu—His(N$^{im}$—R)—N(CH₃) Ala-NH₂. Suitable reagents which furnish nitrous acid in situ are lower alkyl nitrites (e.g. tert-butyl nitrite, iso-amyl nitrite) or an alkali metal nitrite salt (e.g. sodium nitrite, potassium nitrite) in the presence of a strong acid such as hydrochloric, phosphoric, sulfuric, etc. The reaction forming the tripeptide is preferably carried out in the presence of an acid acceptor, preferably a tertiary amine (e.g. triethylamine, pyridine, quinoline, dimethylaniline, etc.), an alkali metal carbonate or other acid binding agent known in the art. If a protecting group is used on histidine, this being optional, it may be removed by employing a reagent such as H₂/Pd or other reagent described by Schroeder and Lubke, The Peptides, 1, pp 72–74 (Academic Press 1965), to yield a compound of formula I.

The following examples are illustrative of the preparation of the compounds of the present invention.

EXAMPLE 1

N-Methyl-L-Alanine Amide 6.18 g (60 mmole) N-methyl-L-alanine is reacted with 4.74 ml thionyl chloride and 40 ml of methanol, previously combined at −10°C, and reacted at ambient temperature for two days. The solvent is removed below 30°C under reduced pressure and the oil dessicated over sodium hydroxide several days in vacuo. The resulting oil is dissolved in methanol previously saturated with ammonia at 0°C and allowed to react for 10 days at ambient temperature. After evaporation of the solvent, the residue is crystallized from ethyl acetate to yield the above titled product, (3.2 g).

| Anal. Calcd. for C₄H₁₀ON₂ | C, 47.03, | H 9.87, | N 27.43 |
|---|---|---|---|
| Found C, 46.53, H 10.53, | | N 25.76 | |

EXAMPLE 2

L-(5-Oxoprolyl)-L-histidine methyl ester

L-5-Oxoproline (13 gr, 0.1 mole) and L-histidine methyl ester dihydrochloride (22.8 gr, 0.1 mole) are suspended in dimethylformamide (200 ml). The mixture is treated with triethylamine (27 ml, 0.2 moles and cooled at −5°C., then dicyclohexylcarbodiimide (20.6 gr, 0.1 mole) is added and the mixture is stirred for 2 hours at −5°C and overnight at room temperature. The dicyclohexylurea which separates is filtered off and the filtrate is evaporated to dryness. The residue is triturated with water and the insoluble solid is filtered off. The filtrate is evaporated to dryness and the residue dried twice with abs. ethanol. The oily residue crystallizes from abs. EtOH to afford the above titled dipeptide methyl ester 13 g (45%), m.p. 198°–199°C; $[\alpha]_D^{22}$ −4.3 (cl, Methanol); R$_f$(n-Butanol-water-acetic acid 4:1:1) 0.30; R$_f$(n-Butanol-water-acetic acid-pyridine 30:24:6:20) 0.50; single spot with Pauly and I₂ reagents.

Anal. Cald. for C₁₂H₁₆N₄O₄ (280.28): C, 51.42; H, 5.75; N, 19.99; Found: C, 51.34; H, 6.04; N, 20.12.

EXAMPLE 3

L-(5-Oxoprolyl)-L-histidyl hydrazide

L-(5-Oxoprolyl)-L-histidine methyl ester of Example 2 (10 gr. 0.036 moles) is dissolved in methanol (150 ml) and treated with hydrazine hydrate 99% (8 ml) at −10°C for one hour then at room temperature overnight. The white solid which separates is filtered and washed with methanol and then with ether. Recrystallization from water-ethanol affords the above-titled dipeptide hydrazide 8.8 gr (88% — Recrystallization from water-ethanol [78%] m.p. 241.5°–242°C; $[\alpha]_D^{22}$ −14.50 (c 1, H$_2$O); R$_f$(n-Butanol-water-acetic acid 4:1:1) 0.05; R$_f$(n-Butanol-water-acetic acid-pyridine 30:24:6:20) 0.10; single spot with Pauly and I$_2$ reagents.

EXAMPLE 4

L-(5-oxoprolyl)-L-histidyl-L-N-methyl-alanine amide acetate

L-(5-oxoprolyl)-L-histidine hydrazide (1.07 g, 3.8 m mole) is dissolved in 25 ml dimethylformamide and 5 ml 2.41 N-hydrochloric acid in tetrahydrofuran added and cooled to −25°C. Isoamyl nitrite (0.81 ml) is added, stirred 20 min. at −25°C followed by 3.3 ml of triethylamine and 0.4 g (4 mmole) of a cold solution of L-N-methyl-alanine amide. The reaction is allowed to proceed for two days at 4°C. The solvent is evaporated under reduced pressure (<30°C) and the resulting oil chromatographed on silica gel using methanol as solvent. Crude product (as judged by TLC) 350 mgs is obtained which is further purified by partition chromatography on Sephadex G-25 F in the system n-butanol-acetic acid-water (4:1:5). One ml. fractions are collected and the fraction in tubes 296–326 is pooled and lyophylized to yield 65 mg of the above titled product.

| Amino acid analysis: | N-Me-Ala | Glu | His | NH$_3$ |
|---|---|---|---|---|
| | 1.13 | 1.0 | 1.01 | 1.13 |
| R$_f$ TLC S.G. MeOH, 0.69; | CHCl$_3$/MeOH 1/1 | | 0.67 | |

The compound of Example 4 has been found to induce the secretion of thyrotropin. The thyrotropin releasing activity was determined in a rat pituitary cell culture system as described by Vale et al., Endocrinology, 91, p 562 (1972) and modified by Grant et al., Biochemical and Biophysical Research Communications, 51, pp 100–106 (1973). The amount of thyrotropin released is determined by radioimmunoassay in accordance with the method described by Bernson et al., Metabolism, 13, p 1135 (1964). The results of the cell culture experiments are shown in the Table which follows:

| Exp. No. | Compound of Example 4 (µg/ml) | TRH (µg/ml) | Thyrotropin Secreted (ng/ml) |
|---|---|---|---|
| 1 | — | — | 140±44 |
| 2 | — | 50 | 561±36* |
| 3 | 50 | — | 813±54* |
| 4 | — | — | 25±18 |
| 5 | — | 1 | 176±75+ |
| 6 | 1 | — | 316±91* |
| 7 | — | 0.1 | 91±81 |
| 8 | 0.1 | — | 287±128+ |
| 9 | — | 0.05 | 258±31* |
| 10 | — | 0.01 | 218±86+ |

*p < 0.01 (99% confidence level)
+p < 0.05 (95% confidence level)

As shown in the foregoing table, at 50 µg/ml, 1.0 µg/ml and 0.1 µg/ml, the compound of Example 4 induced the secretion of more thyrotropin than did TRH. Thus, the tripeptide of the present invention is useful as a diagnostic agent in evaluating the functioning of the anterior pituitary gland in mammals including humans. The compound may be administered to mammals by intravenous or subcutaneous injection or orally. A practical dose range for intravenous injection in a isotonic saline solution is believed to be between about 200 µg and 1 mg of the compound. The effective dose for oral will be somewhat higher than for intravenous injection. Oral administration can be in the form of a tablet, capsule, etc. The dosage forms may additionally include excipients, binders, fillers and other therapeutically insert ingredients. A typical tablet may contain starch, calloidal silica and magnesium stearate.

What is claimed is

1. A compound selected from L-(5-oxoprolyl)-L-histidyl-L N-methyl-alanine amide and its non-toxic salts.

* * * * *